April 13, 1943.   A. L. PARKER ET AL   2,316,711
TUBE COUPLING
Filed March 31, 1941   3 Sheets-Sheet 1

Inventors
A. L. Parker
W. Musgrave
J. N. Wolfram
By Mason & Porter
Attorneys

April 13, 1943.   A. L. PARKER ET AL   2,316,711
TUBE COUPLING
Filed March 31, 1941   3 Sheets-Sheet 2

Inventors
Arthur L. Parker
Wilton Margrave
John N. Wolfram
Mason & Porter
By
Attorneys April 13, 1943.  A. L. PARKER ET AL  2,316,711

TUBE COUPLING

Filed March 31, 1941  3 Sheets-Sheet 3

Inventors
Arthur L. Parker
Wilton Margrave
John N. Wolfram
By Mason & Porter
Attorneys Patented Apr. 13, 1943

2,316,711

UNITED STATES PATENT OFFICE 2,316,711

TUBE COUPLING

Arthur L. Parker, Wilton Margrave, and John N. Wolfram, Cleveland, Ohio; said Margrave and said Wolfram assignors to said Parker Application March 31, 1941, Serial No. 386,202

8 Claims. (Cl. 285—86)

The present invention relates to new and useful improvements in tube couplings, and more particularly to improvements in couplings adapted for securely clamping the flared ends of metal tubes such as are typified in the U. S. Letters Patent 1,893,442, issued to Arthur L. Parker, January 3, 1933.

In tube couplings of the character stated it sometimes happens that excessive wrench pressures are applied during assembly and tightening of the couplings with the result that flared tube end portions being clamped are pinched thin or even entirely pinched off at the base of the tube end flare. In such couplings the tube seal is rendered inefficient and subject to leakage, and tubes thus pinched are also subject to being pulled out of the couplings under hard use strains. It is the purpose of the present invention to produce an improved coupling in which these objectionable conditions are avoided.

It will be obvious that the closer the point at which the tube flare is pinched off approximates the base of the flare, or in other words the juncture of the flare with the tube proper, the greater will be the danger of leakage and pulling out of the tube. It is therefore an object of the present invention to provide a tube coupling in which the clamping face or seat angle of the sleeve or clamping surface is either stepped or made much deeper or more acute than the surface of the tube flare which it opposes so that any pinching through of the tube would occur at a point remote from the flare base.

Another object of the invention is to provide a tube coupling of the character stated in which the clamping face of the sleeve or clamping surface includes two distinct and longitudinally spaced portions successively engageable with the tube flare, the last engageable of said portions being disposed generally parallel the tube flare portion which it opposes.

Another object of the invention is to provide a tube coupling of the character stated in which the clamping sleeve or tube clamping surface includes an outwardly angled portion so related to an opposing portion of the tube flare that upon tightening of the coupling said opposing portion of the tube flare will be displaced outwardly to interlock with said angled portion and prevent pulling out of the tube.

With the above and other objects in view that will hereinafter appear, the nature of the invention will be more fully understood by following the detailed description, the appended claims, and the several views illustrated in the accompanying drawings.

Figure 1:
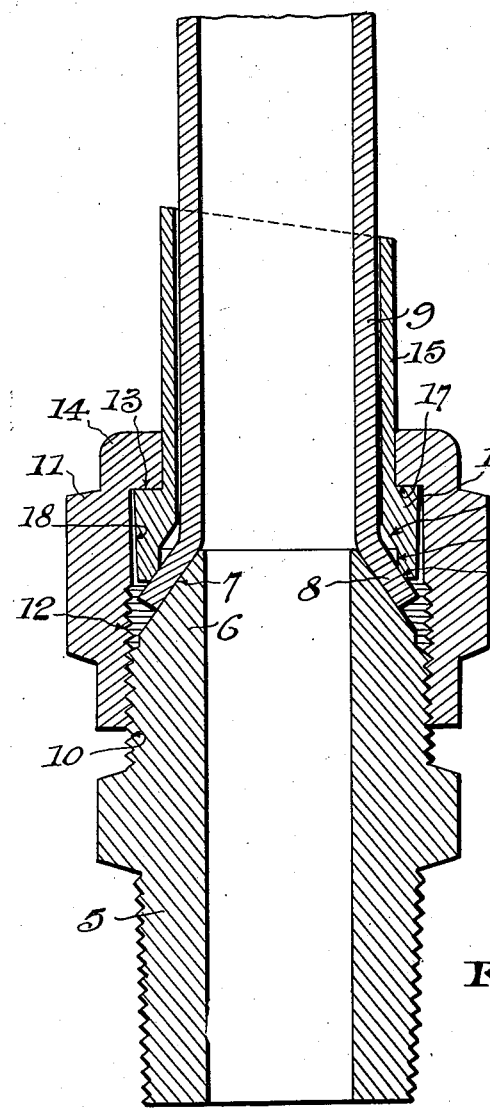
Figure 1 is a central longitudinal section illustrating one form of the invention, the coupling being shown in the loosely assembled condition.

In the coupling herein disclosed as an example of embodiment of the invention there is included a male member and a female member threadably connected, the female member being formed of two parts, a nut and a clamp sleeve, and the tube to be coupled is firmly clamped between these male and female members. The invention resides particularly in the novel formation of the clamp sleeve, and in the novel combination of this element with the other parts of the coupling. The novel structures will be found particularly advantageous when used in coupling tubes which are relatively soft, such as tubes formed of the softer alloys of aluminum, but the invention is not to be considered limited to use in coupling aluminum tubes.

The male coupling member 5 includes a coniform seat extension 6 which presents a tapered clamping surface 7 for engaging in the flared end 8 of the tube 9 which is to be clamped in the coupling. The male member is externally threaded as at 10 to receive the female member, and it will be observed by reference to Figure 1 of the drawings that the bore in the male member and the bore in the tube to be coupled are substantially the same in diameter.

The female member, which is formed in two parts, comprises a nut or clamp member 11 which is internally threaded as at 12 and includes an abutment shoulder 13 formed in an extension 14 extending upwardly from said nut. The second part of the female member comprises a clamp sleeve 15 which surrounds the tube 9 within the nut 11 and extends longitudinally beyond the nut extension 14 in the manner illustrated in Figure 1. This sleeve includes a lower enlargement 16 providing an abutment shoulder 17 adapted to be engaged by the abutment shoulder 13 of the nut 11 and which has the lower end of its bore step-flared in a manner soon to be described for clamping engagement with the tube flare 8. The external diameter of the sleeve enlargement 16 is slightly tapered, as at 18, to avoid expansion thereof into gripping contact with the inner wall of the nut 11.

The portion of the lower extremity of the sleeve 15 which opposes the flared end 8 of the tube 9 is provided with stepped, or longitudinally spaced, flare portions 19 and 20 connected by a wall portion 21 which is concentric with the tube axis, said flared portions being presented for successive engagement with the external surface of the tube flare 8 and bearing parallel relation to said surface in the manner clearly illustrated in Figure 1 of the drawings.

Figure 2:
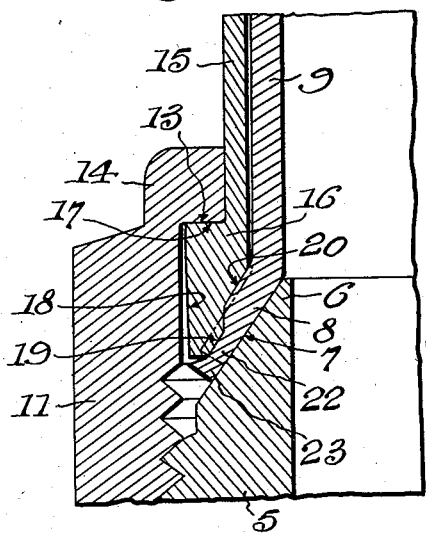
Figure 2 is a fragmentary longitudinal sectional view illustrating the normally tight assembly condition of the coupling illustrated in Figure 1.

When the nut 11 is screwed home on the male coupling member, the sleeve 15 is forced along the tube and the flared step 19 of the sleeve is first caused to engage in clamping relation with the external surface of the tube flare 8. Under conditions of normally tight assembly of the coupling, this first engaging step or flare 19 of the sleeve pinches into the tube flare 8 and thins the same out as indicated in Figure 2, spreading or displacing the extremity of the tube flare, as at 23. In this normally tight engagement of the parts both sleeve steps or flares 19 and 20 engage in clamping relation with the external surface of the tube flare as indicated in Figure 2.

Figure 3:
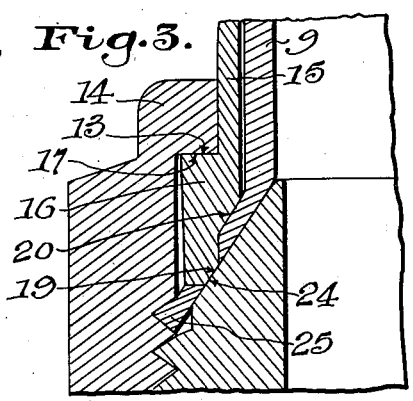
Figure 3 is a view similar to Figure 2 illustrating an excessively tight assembly condition of the coupling illustrated in Figure 1.

Should abnormal wrench pressures be applied in tightening the coupling, the condition illustrated in Figure 3 of the drawings may be brought about. In this excessively tight engagement of the parts the sleeve step or flare portion 19 may be caused to entirely pinch off the end extremity of the tube flare 8, engaging in direct contact with the male element extension 6, as indicated in Figure 3, and displacing said flare extremity as at 25. In this condition of the parts, however, the tube step or flare 20 engages the external surface of the tube flare in efficient sealing and clamping contact in the manner clearly illustrated in Figure 3.

It will be obvious that in a coupling in which the sleeve includes a single flare surface which engages the external surface of the tube flare, application of excessive wrench pressures can cause the sleeve to pinch off the tube flare right at its base, that is at the juncture of the flare 8 and the tube body 9, thereby destroying the intended efficient seal and making it possible for the tube to pull out of the coupling under use strains. By causing the sleeve to engage the tube flare at longitudinally spaced points, the first engaging portion being caused to contact the tube flare 8 at a point spaced remotely from the flare base, any pinching through of the flare occurs well away from the flare and tube body juncture and the tube remains secure against pulling out and is clamped and efficiently sealed by contact of the non-pinching portion of the sleeve remaining in contact therewith. See for example the step portion 20 as illustrated in Figure 3.

Figure 4:
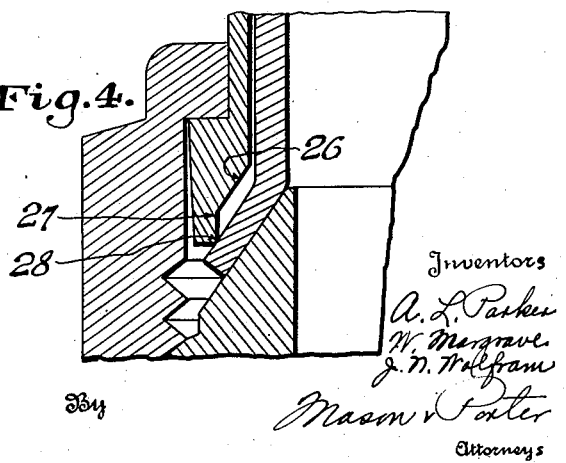
Figure 4 is a fragmentary longitudinal sectional view illustrating a modified form of sleeve structure, the loosely assembled condition of the coupling being illustrated.

In Figure 4 there is illustrated a slightly modified form of clamp sleeve which is similar to the form of sleeve illustrated in Figures 1 to 3 in that it includes portions which progressively engage the tube flare. This form of sleeve includes a single clamping and sealing flare 26 which opposes the external surface of the tube flare in parallel relation and merges into a cylindrical wall 27 which is concentric with the axis of the tube. In this sleeve the wall 27, instead of merging into a second sealing flare, as in the sleeve of Figures 1 to 3, terminates in a line contact end edge 28. This end edge 28 of the sleeve first engages the tube flare in annular line sealing contact as indicated in Figure 4 which illustrates the initial contact of the sleeve with the tube flare. It will be obvious that in the forced assembly of the coupling, as the sleeve end is caused to pinch deeply into the tube flare, the sealing flare surface 26 will ultimately be brought into tight clamping and sealing contact with the opposing surface of the tube flare, and the tube will be efficiently sealed and secured against pulling out of the coupling by this sealing contact at and around the base of the flare.

Figure 5:
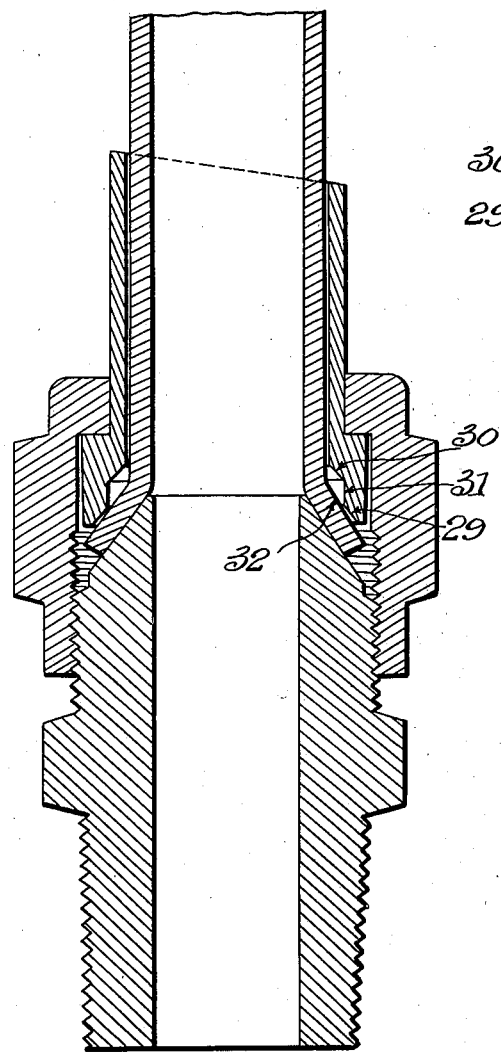
Figure 5 is a central longitudinal sectional view of a coupling embodying another modified form of tube clamping sleeve in which the successively engageable tube flare clamping faces are formed at a more obtuse angle than the face of the tube flare which they oppose, the loosely assembled condition of the coupling being illustrated.
Figure 6:
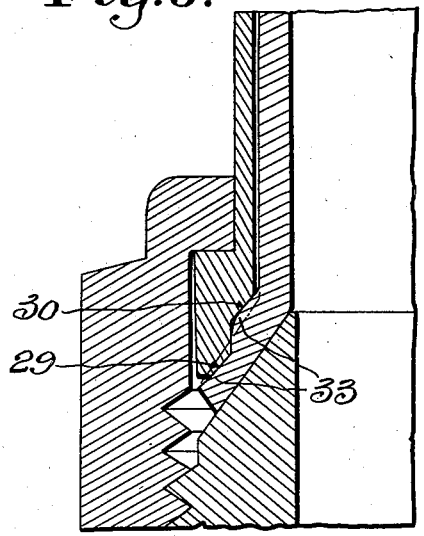
Figure 6 is a fragmentary longitudinal sectional view illustrating coupling parts of Figure 5 in normally tight assembly relation.
Figure 7:
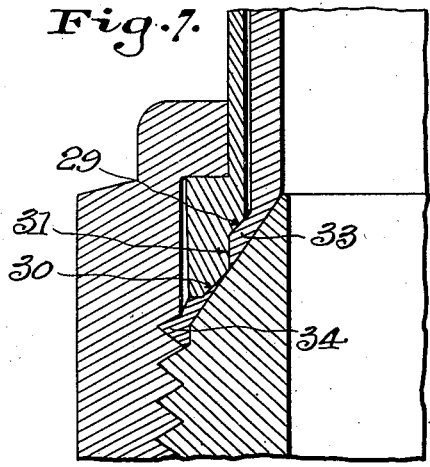
Figure 7 is a view similar to Figure 6 illustrating an excessively tight assembly relation of coupling parts of Figure 5.

In Figures 5 through 7 of the drawings, another modified form of clamp sleeve is illustrated. This sleeve is identical in construction with the sleeve illustrated in Figures 1 to 3 except that the successively engaging stepped flares or clamping and sealing surfaces 29 and 30 are not disposed in parallel relation with the tube flare surface which they oppose. These flare surfaces are connected in stepped relation by a cylindrical wall portion 31 which is concentric with the tube axis, but they are disposed in more obtuse angular relation to the tube axis than is the external surface of the tube flare, as indicated at 32.

By thus disposing the sleeve steps or flares 29, 30 at a greater angle than the tube flare, as at 32, when these flares are clamped against the tube flare, metal of the tube flare is displaced so as to provide outwardly directed wedge portions 33 which serve to provide a very efficient tube seal and also to more positively prevent pulling out of the tube. In Figure 5 of the drawings, the initial contact or loose assembly relation of the coupling parts is illustrated. Normally tight engagement of the coupling parts is illustrated in Figure 6, and in Figure 7 excessively tight engagement of the parts is illustrated. It will be noted that when this excessively tight engagement of the parts is brought about by excessive wrench pressure, the first engaged step 29 will pinch through the flare and displace metal as at 34 but the tube will remain tightly sealed and securely held against pulling out by reason of the contact of the second engaged flare or step 30 and the wedge clamp portion 33 of the tube flare adjacent and surrounding the base thereof.

Figure 8:
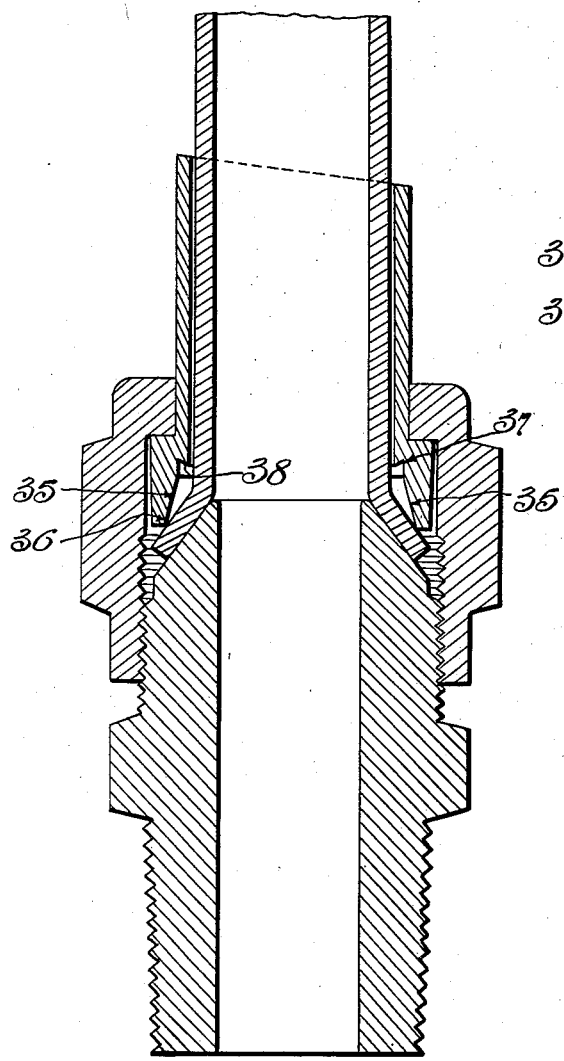
Figure 8 is a central longitudinal sectional view of a tube coupling embodying another modified form of tube clamping sleeve.
Figure 9:
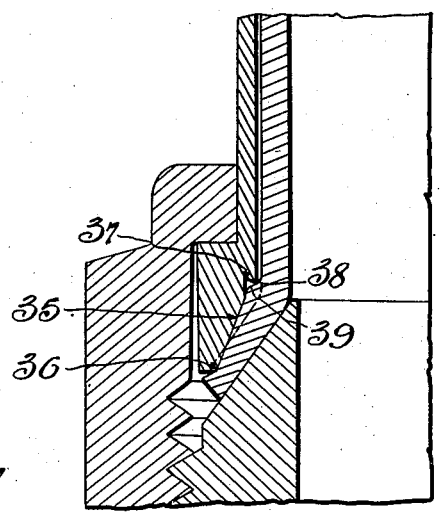
Figure 9 is a fragmentary longitudinal sectional view illustrating a normally tight assembly relation of coupling parts of Figure 8.
Figure 10:
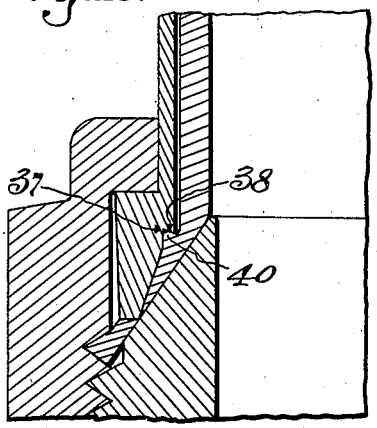
Figure 10 is a view similar to Figure 9 illustrating an excessively tight assembly relation of coupling parts of Figure 8.

In Figures 8, 9 and 10, a still further modified sleeve structure is illustrated. This sleeve structure embodies a single flare surface 35 which is disposed at a much more acute angle than the external surface of the tube flare and terminates in a line contact end edge portion 36 which engages the tube flare at a point remote from the base thereof in the manner illustrated in Figure 8 in which the loose engagement or initial contacting relation of the parts is shown. At the base of the flare 35 a notch 37 is provided, said notch being defined at its upper portion by an undercut wall 38.

In Figure 9 the normal tight engagement or assembly relation of this form of coupling is illustrated, and in Figure 10 excessively tight engagement brought about by excessive application of wrench pressure is illustrated. It will be observed that in the normal assembly of this coupling the metal of the tube flare is displaced into the notch 37, as at 39, and it will be obvious that this crowding of metal by the sleeve flare surface 35 into the notch 39 serves not only to provide a highly efficient tube seal but also to positively secure the tube against pulling out of the coupling. In this normal tight engagement of the coupling parts the tube flare metal is only partially displaced into the notch 37, as shown in Figure 9, but when excessive wrench pressure is applied, bringing about the coupling condition illustrated in Figure 10, the metal of the tube flare is so displaced as to fill the notch, as at 40, and the end extremity 36 of the sleeve may pinch clear through the tube flare and engage the clamping seat of the male coupling in the manner illustrated. In each condition of clamping engagement, however, the undercut wall 38 so engages the crowded metal of the tube flare as to positively secure the tube against pulling out of the coupling.

In the foregoing description there are disclosed several forms of coupling in which provision is made for preventing the heel of the sleeve from shearing through the tube flare in the region of the base thereof so that there will always be a portion of the flare remaining to be gripped by the coupling members. In these disclosures there are also included features which additionally assure against pulling of the tube out of the coupling under use strains.

It is of course to be understood that the details of structure and arrangement of parts may be variously changed and modified without departing from the spirit and scope of my invention.

I claim:

1. In a coupling for tubes having the ends thereof flared, coupling members having threaded engagement with each other, one of said coupling members having a seat associated therewith adapted to engage the inner face of the flared end of the tube and the other coupling member having a clamping shoulder, and a clamping sleeve surrounding said tube and having a solid head provided with a shoulder against which the clamping shoulder of said other coupling member engages for forcing the sleeve head against the flared end of the tube, the face of the sleeve head opposing the flared end of the tube being equipped with longitudinally spaced flared end contacting portions disposed for successively engaging said flared end first at a point remote from the flare base and later at a point nearer said base, the spacing of said flared end contacting portions being such that upon application of excessive clamping pressure, the first-named flared end contacting portion will contact the seat to act as a stop for the clamping effect of the second flared end contacting portion before it pinches through the flared tube.

2. In a coupling for tubes having the ends thereof flared, coupling members having threaded engagement with each other, one of said coupling members having a seat associated therewith adapted to engage the inner face of the flared end of the tube and the other coupling member having a clamping shoulder, and a clamping sleeve surrounding said tube and having a solid head provided with a shoulder against which the clamping shoulder of said other coupling member engages for forcing the sleeve head against the flared end of the tube, the face of the sleeve head opposing the flared end of the tube being equipped with two longitudinally spaced flared end contacting portions disposed for successively engaging said flared end first at a point remote from the flare base and later at a point nearer said base, the spacing of said flared end contacting portions being such that upon application of excessive clamping pressure, the first-named flared end contacting portion will contact the seat to act as a stop for the clamping effect of the second flared end contacting portion before it pinches through the flared tube, the first effective portion of said contacting portions engaging the tube end flare in annular line contact and the second effective portion of said contacting portions being substantially parallel the tube end flare surface which it opposes.

3. In a coupling for tubes having the ends thereof flared, coupling members having threaded engagement with each other, one of said coupling members having a seat associated therewith adapted to engage the inner face of the flared end of the tube and the other coupling member having a clamping shoulder, and a clamping sleeve surrounding said tube and having a solid head provided with a shoulder against which the clamping shoulder of said other coupling member engages for forcing the sleeve head against the flared end of the tube, the face of the sleeve head opposing the flared end of the tube being equipped with longitudinally spaced flared end contacting portions disposed for successively engaging said flared end first at a point remote from the flare base and later at a point nearer said base, the spacing of said flared end contacting portions being such that upon application of excessive clamping pressure, the first-named flared end contacting portion will contact the seat to act as a stop for the clamping effect of the second flared end contacting portion before it pinches through the flared tube, each of the successively engaging flared end contacting portions being flared and disposed substantially parallel the tube end flare surface which it opposes.

4. In a coupling for tubes having the ends thereof flared, coupling members having threaded engagement with each other, one of said coupling members having a seat associated therewith adapted to engage the inner face of the flared end of the tube and the other coupling member having a clamping shoulder, and a clamping sleeve surrounding said tube and having a solid head provided with a shoulder against which the clamping shoulder of said other coupling member engages for forcing the sleeve head against the flared end of the tube, the face of the sleeve head opposing the flared end of the tube being equipped with longitudinally spaced flared end contacting portions disposed for successively engaging said flared end first at a point remote from the flare base and later at a point nearer said base, the spacing of said flared end contacting portions being such that upon application of excessive clamping pressure, the first-named flared end contacting portion will contact the seat to act as a stop for the clamping effect of the second flared end contacting portion before it pinches through the flared tube, each of the successively engaging flared end contacting portions being flared at a more obtuse angle than the angle of flare of the tube end flare surface which it opposes thereby to be effective during the clamping of the tube to deform tube end flare portions into outwardly spread wedge form serving to render the coupling more effective against use strains tending to pull out the tube.

5. In a coupling for tubes having the ends thereof flared, coupling members having threaded engagement with each other, one of said coupling members having a seat associated therewith adapted to engage the inner face of the flared end of the tube and the other coupling member having a clamping shoulder, and a clamping sleeve surrounding said tube and having a solid head provided with a shoulder against which the clamping shoulder of said other coupling member engages for forcing the sleeve head against the flared end of the tube, the face of the sleeve head opposing the flared end of the tube being flared for engagement with said flared tube end and provided with a notch opposed to the base of the tube end flare and into which metal of the tube end is displaced during clamping of the tube to form a sleeve and tube interlock effective to overcome use strains tending to pull out the tube, the flared end of the sleeve having a portion longitudinally spaced from said notch, the spacing of said portion and said notch being such that any application of excessive clamping pressure effective to cause said portion to pinch through the tube flare will cause said portion to contact the seat and act as a stop for preventing additional displacement of the flared end of the tube.

6. In a coupling for tubes having the ends thereof flared, coupling members having threaded engagement with each other, one of said coupling members having a seat associated therewith adapted to engage the inner face of the flared end of the tube and the other coupling member having a clamping shoulder, and a clamping sleeve surrounding said tube and having a solid head provided with a shoulder against which the clamping shoulder of said other coupling member engages for forcing the sleeve head against the flared end of the tube, the face of the sleeve head opposing the flared end of the tube being flared at a more acute angle than the flared tube end for engagement with said tube end extremity first and then progressively throughout the remainder of said more acute flare and including a notch opposed to the base of the tube end flare and into which metal of the tube end is displaced during clamping of the tube to form a sleeve and tube interlock effective to overcome use strains tending to pull out the tube, the flared end of the sleeve having a portion longitudinally spaced from said notch, the spacing of said portion and said notch being such that any application of excessive clamping pressure effective to cause said portion to pinch through the tube flare will cause said portion to contact the seat and act as a stop for preventing additional displacement of the flared end of the tube.

7. In a coupling for tubes having the ends thereof flared, coupling members having threaded engagement with each other, one of said coupling members having a seat associated therewith adapted to engage the inner face of the flared end of the tube, and a clamping sleeve surrounding said tube, means effective upon threading together of the coupling members for forcing the sleeve longitudinally toward the flared end of the tube, the face of the sleeve head opposing the flared end of the tube being equipped with longitudinally spaced flared end contacting portions disposed for successively engaging said flared end first at a point remote from the flare base and later at a point nearer said base, the spacing of said flared end contacting portions being such that upon application of excessive clamping pressure, the first-named flared end contacting portion will contact the seat to act as a stop for the clamping effect of the second flared end contacting portion before it pinches through the flared tube.

8. In a coupling for tubes having the ends thereof flared, coupling members having threaded engagement with each other, one of said coupling members having a seat associated therewith adapted to engage the inner face of the flared end of the tube, and a clamping sleeve surrounding said tube, means effective upon threading together of the coupling members for forcing the sleeve longitudinally toward the flared end of the tube, the face of the sleeve head opposing the flared end of the tube being equipped with longitudinally spaced flared end contacting portions disposed for successively engaging said flared end first at a point remote from the flare base and later at a point nearer said base, the spacing of said flared end contacting portions being such that upon application of excessive clamping pressure, the first-named flared end contacting portion will contact the seat to act as a stop for the clamping effect of the second flared end contacting portion before it pinches through the flared tube, each of the successively engaging flared end contacting portions being flared at a more obtuse angle than the angle of flare of the tube end flare surface which it opposes thereby to be effective during the clamping of the tube to deform tube end flare portions into outwardly spread wedge form serving to render the coupling more effective against use strains tending to pull out the tube.

ARTHUR L. PARKER.
WILTON MARGRAVE.
JOHN N. WOLFRAM.